United States Patent
Ramaiah et al.

(10) Patent No.: US 7,114,181 B2
(45) Date of Patent: Sep. 26, 2006

(54) PREVENTING NETWORK DATA INJECTION ATTACKS

(75) Inventors: Anantha Ramaiah, Sunnyvale, CA (US); Randall Stewart, Crystal Lake, IL (US); Peter Lei, Arlington Heights, IL (US); Patrick Mahan, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 81 days.

(21) Appl. No.: 10/792,146

(22) Filed: Mar. 2, 2004

(65) Prior Publication Data

US 2005/0160478 A1 Jul. 21, 2005

Related U.S. Application Data (60) Provisional application No. 60/537,372, filed on Jan. 16, 2004.

(51) Int. Cl.
G06F 11/28 (2006.01)
G06F 11/00 (2006.01)
G06F 11/30 (2006.01)

(52) U.S. Cl. .......................... 726/22; 726/23; 713/170; 709/223; 709/224

(58) Field of Classification Search ................. 726/22, 726/23
See application file for complete search history.

(56) References Cited

U.S. PATENT DOCUMENTS

2002/0145976 A1 10/2002 Meyer et al.
2003/0154399 A1* 8/2003 Zuk et al. .................. 713/201
2003/0191844 A1 10/2003 Meyer et al.
2004/0052234 A1 3/2004 Ameigeiras et al.

OTHER PUBLICATIONS

Peterson et al.; Computer Networks; Second Edition; Academic Press; 2000; Chapters 2 and 5.*
Stewart, R., "Transmission Control Protocol security considerations draft-ietf-tcpm-tcpsecure-00.txt", Network Working Group (Draft, 2004); pp. 1-10.
"Transmission Control Protocol", *Information Sciences Institute* (1981), 89 pages.

* cited by examiner

Primary Examiner—Gilberto Barrón
Assistant Examiner—Jung Kim
(74) Attorney, Agent, or Firm—Christopher J. Palermo; Hickman Palermo Truong & Becker LLP

(57) ABSTRACT

Approaches for preventing TCP data injection attacks in packet-switched networks are disclosed. A first approach provides for dropping received segments that carry ACK values smaller than the next unacknowledged sequence number expected minus the maximum window size. This approach helps keep spurious injected segments out of the TCP re-assembly buffer. In a second approach, heuristics are used to examine the sequence number of a newly arrived segment, and when the sequence number is the next expected, then the newly arrived segment is used and the contents of the re-assembly buffer are not considered. Further, if the data payload of the newly arrived segment overlaps in sequential order with segments already in the re-assembly buffer, the overlapped segments in the re-assembly buffer are considered spurious and are discarded. Thus, this approach helps remove spurious data from the re-assembly buffer if the first approach somehow fails to prevent the data from entering the re-assembly buffer.

44 Claims, 5 Drawing Sheets

PREVENTING NETWORK DATA INJECTION ATTACKS

CROSS-REFERENCE TO RELATED APPLICATIONS

This application claims domestic priority under 35 U.S.C. 119(e) from prior provisional application Ser. No. 60/537,372 filed Jan. 16, 2004, of Anantha Ramaiah et al., entitled "Preventing Network Data Injection Attacks,", the entire contents of which is hereby incorporated by reference as if fully set forth herein.

FIELD OF THE INVENTION

The present invention generally relates to computer networks. The invention relates more specifically to preventing data injection attacks in networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networks have become an important tool for businesses and consumers alike, many of which are now dependent on the constant availability of network resources such as mail servers, Web sites, and content servers. As use of networks increases, protecting networks from disruption by malicious entities becomes more important. For example, denial of service ("DoS") attacks may deprive legitimate users of access to network services, and have been used successfully to disrupt legitimate user access to internet sites such as Yahoo! and CNN.

Data injection attacks may result in DoS or other adverse effects. One type of data injection attack takes advantage of the basic design of the Transmission Control Protocol ("TCP"), one of the foundational protocols of the Internet, as defined in Internet Engineering Task Force (IETF) Request for Comments (RFC) 793. In a data injection attack, an attacker guesses parameter values for a valid TCP connection and then sends spurious segments that contain malicious or spurious data payloads. If the receiver passes such segments to an application, malfunctions may occur when the application acts on or executes the data payloads.

A typical implementation of TCP that is compliant with RFC 793 and is acting as a receiver of data maintains out-of-order data in a re-assembly buffer pending receipt of any missing segments. The receiver sends an acknowledgment ("ACK") message for each segment that is received out of order and indicating the last valid sequence number. The sender holds non-acknowledged segments in a re-transmission buffer. This process enables a sender to rapidly re-transmit segments that have been lost in transmission, because such segments are not acknowledged.

One type of TCP data injection attack exploits the foregoing mechanisms in TCP implementations that are intended to manage segments that arrive out-of-order and need to be re-assembled into the proper order before they are passed to applications at logical layers above TCP. Border Gateway Protocol (BGP), Hypertext Transfer Protocol (HTTP), some voice protocols, Multi-Protocol Label Switching (MPLS), and other protocols use TCP connections and are targets for these attacks. The consequences can be severe. For example, when a BGP session of a router is disrupted by closing the associated TCP connection, the router will discard all BGP routes that it has created, essentially causing a failure of the BGP process. As a result, the BGP process must re-synchronize itself with peer routers in the network, and during the re-synchronization period the failed router cannot forward any traffic.

Further, data injection attacks may result in presenting malicious commands to an upstream process, needlessly filling the re-assembly buffer, faulty operation of other higher-layer applications, initiating "ACK wars," etc. Accordingly, researchers in this field are interested in creating ways to thwart TCP data injection attacks, without fundamentally altering the operation of TCP as specified in RFC 793.

A successful attack must inject a TCP segment that carries proper values for source port, destination port; a range of values is allowed for sequence number and ACK number. The allowed ranges for these values are large, so that mounting a brute-force attack involving serially checking all possible values for each parameter would seem impossible. However, in most TCP implementations the task of selecting valid values is simpler because certain loopholes present in RFC 793. These loopholes create security vulnerabilities in implementations that are compliant with RFC 793. For example, assigning a pseudo-random 32-bit value as the Initial Sequence Number (ISN) for a new TCP connection might appear to prevent an attacker from guessing the correct sequence number in any practical way, because the number of potentially correct values is $2^{32}$ or approximately 4 billion values. However, a conventional TCP implementation compliant with RFC 793 will accept a segment if the sequence number of the segment falls within a window or range of acceptable values, even if the sequence number is not an exact match to the next expected sequence number. The window or range typically is the same as the size in bytes of the re-assembly buffer, and is used to compensate for the possibility that segments may be lost. In some implementations of TCP the range of allowed sequence values may be as large as 16,384, 65,535, or larger.

A consequence is that the attacker does not need to generate all 32 bits of the sequence number correctly to provide a number that a receiving node will accept, even when a truly random or pseudorandom ISN is used. If the range of allowed sequence values is sufficiently large, then the chance is greatly increased that an attacker can guess a correct sequence value through either random or brute-force selection in a practical amount of time. The larger the window established by the receiving node, the easier it is for the hacker to carry out this attack.

Further, most implementations use a relatively small range of values for the initial port number, and merely increment the port number for each new connection. As a result, using ordinary computing resources it may be relatively easy for an attacker to guess the port values that are used by two endpoints to a legitimate TCP connection.

Still another vulnerability occurs because most TCP implementations do not test whether the ACK value is equal to an expected ACK value or even within a range of allowed ACK values. Instead, most implementations will accept any segment that carries an ACK value greater than a previously received ACK value, provided the sequence number is within the allowed range. RFC 793 defines an ACK value as an unsigned integer in the range 1 to $2^{32}$. Thus, an attacker who guesses an allowed sequence number can succeed with a data injection attack by trying only two ACK values—one (1) or $2^{32}-1$—and one or the other is certain to be accepted.

The result of the foregoing compromises is that an attacker can theoretically inject data into a connection in ($2^{32}$/window-size/2) segments, or roughly 30,000 segments in most implementations. Therefore even a brute-force attack can proceed relatively rapidly using conventional computing equipment.

Approaches for preventing network DoS Reset attacks are described in co-pending application Ser. No. 10/755,146, filed Jan. 9, 2004, entitled "Preventing Network Reset Denial of Service Attacks," by Mitesh Dalal et al. An approach for addressing a similar attack, known as the SYN-RST attack, is provided in co-pending application Ser. No. 10/641,494, filed Aug. 14, 2003, entitled "Detecting network denial of service attacks," of Pritam Shah et al., and assigned to the same assignee hereof. The approach of Shah et al. is appropriate for an intermediate router rather than a TCP endpoint device, but does not fully address all issues described in this disclosure.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for preventing network data injection attacks is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Embodiments are described herein according to the following outline:

1.0 Overview
2.0 Approaches for Preventing Network Data Injection Attacks
  2.1 Approach for Discarding Data Segments Upon Arrival
  2.2 Approach for Removing Spurious Data Segments from Re-Assembly buffer Based On Overlap
3.0 Implementation Mechanisms—Hardware Overview
4.0 Extensions and Alternatives 1.0 Overview As an introduction only, and without limiting the scope of the appended claims, the needs identified in the foregoing Background, and other needs and objects that will become apparent for the following description, are achieved in the present invention, which comprises, in one aspect, a method for preventing an attack on a network, wherein the attack comprises injecting a spurious transmission control protocol (TCP) segment into a TCP connection between a sender and a receiver, comprising the computer-implemented steps of receiving a TCP segment carrying an ACK value; determining whether the ACK value is less than the difference of a next unacknowledged sequence value and a maximum window size associated with the TCP connection; and discarding the TCP segment when the ACK value is less than the difference of a next unacknowledged sequence value and the lesser of either the total number of segments sent thus far or the maximum window size associated with the TCP connection.

A second approach comprises receiving a first TCP segment carrying a sequence value; determining whether the sequence value is equal to a next expected sequence value; when the sequence value is equal to a next expected sequence value, determining whether data carried in the first TCP segment overlaps data carried in one or more second TCP segments that were previously received in a re-assembly buffer; and discarding the one or more second TCP segments when the first TCP segment overlaps any data segment previously received in a re-assembly buffer.

In other aspects, the invention encompasses a computer apparatus and a computer-readable medium configured to carry out the foregoing steps. Further, many other features and aspects will become apparent from the following description and from the appended claims.

2.0 Approaches for Preventing TCP Denial of Service Attacks

Several approaches for preventing network data injection attacks are described. A first approach provides for dropping received segments that carry ACK values smaller than the next unacknowledged sequence minus the maximum window size. The term "smaller" is used herein in the context of unsigned integer values in which wraparound may occur. This approach helps keep spurious injected segments out of the TCP re-assembly buffer. Only a small change in the logic of a TCP process acting as receiver is needed. In a second approach, heuristics are used to examine the sequence number of a newly arrived segment, and when the sequence number is the next expected, then the newly arrived segment is used and the contents of the re-assembly buffer are not considered. Further, if the data payload of the newly arrived segment overlaps in sequential order with segments already in the re-assembly buffer, the overlapped segments in the re-assembly buffer are considered spurious and are discarded. Thus, this approach helps remove spurious data from the re-assembly buffer if the first approach somehow fails to prevent the data from entering the re-assembly buffer.

2.1 Approach for Discarding Data Segments Upon Arrival

Figure 1:
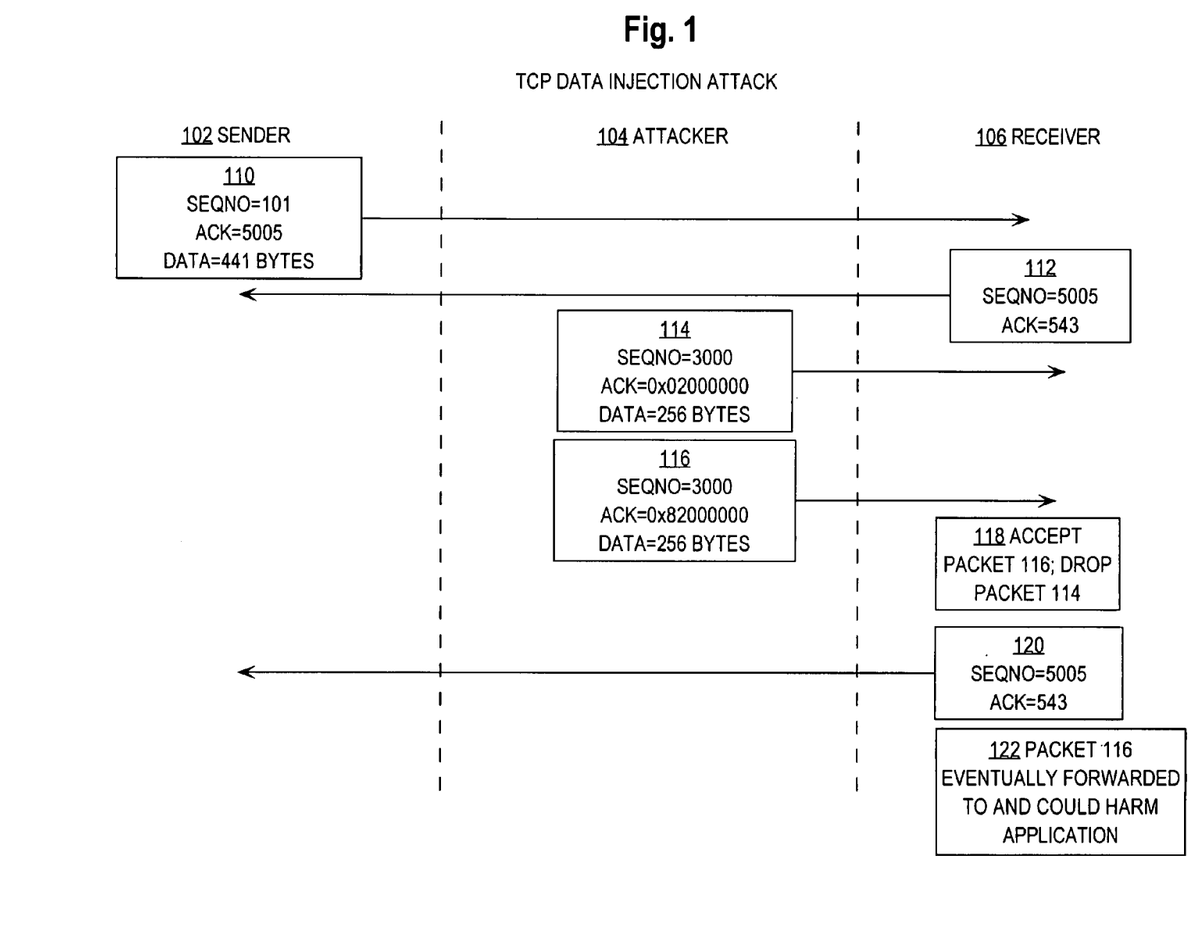
FIG. 1 is a message flow diagram that illustrates one technique for perpetrating a TCP data injection attack.
Figure 2:
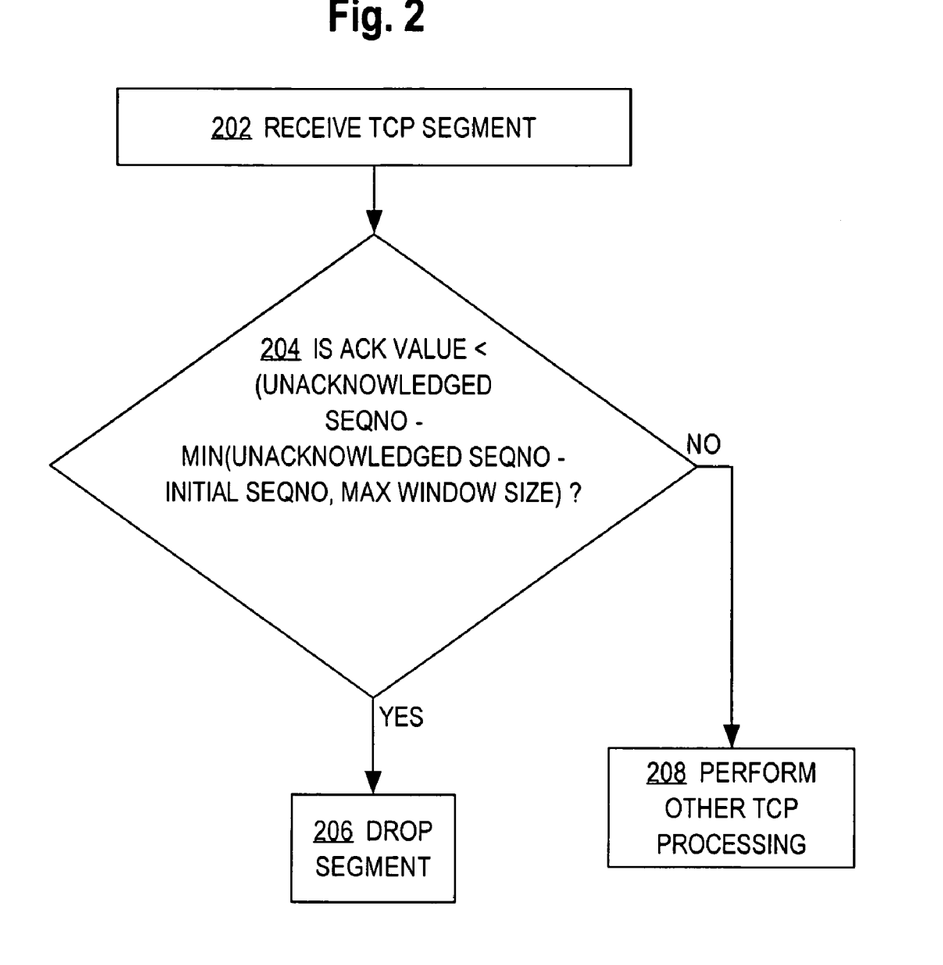
FIG. 2 is a flow diagram that illustrates an approach for discarding data segments upon arrival.

A first approach for preventing TCP data injection attacks is now described with reference to FIG. 1 and FIG. 2. FIG. 1 is a message flow diagram that illustrates one technique for perpetrating a TCP data injection attack. FIG. 2 is a flow diagram that illustrates an approach for discarding data segments upon arrival.

The process of FIG. 2 to cause the message flows shown by example in FIG. 1 may be implemented in one or more computer programs, sequences of instructions or other software elements that are executed by a network element acting as an endpoint in a TCP connection. For example, FIG. 2 may be implemented as part of a TCP application or feature of an operating system of a router, switch or other element of network infrastructure. Alternatively FIG. 2 may be implemented as a TCP process, stack, adapter or agent hosted by or associated with the operating system of a personal computer, workstation or other network end station.

In FIG. 1, Sender 102, Attacker 104 and Receiver 106 represent endpoints in a TCP connection. Sender 102, Attacker 104 and Receiver 106 may comprise routers, switches, hubs, gateways, personal computers, workstations, servers, or other devices that are or can be connected to or communicate with a network. Attacker 104 is any entity that is injecting unwanted or spurious segments or segments into a TCP flow or connection that has been established between Sender 102 and Receiver 106. Attacker 104 may comprise a workstation, personal computer, router, switch, or other processing element.

Sender 102, Receiver 106, and Attacker 104 participate in one or more networks. Further, Sender 102, Receiver 106, and Attacker 104 may be in or accessible through a local area network (LAN), wide area network (WAN), one or more internetworks, or any other kind of network or subset thereof, in which the Transmission Control Protocol (TCP) is used to establish connections between network elements. Such a network may contain additional network infrastructure elements such as routers, switches, etc. and other end station devices such as workstations, printers, servers, etc. In one implementation, Sender 102, Receiver 106, and Attacker 104 all are communicatively coupled to a public packet-switched network such as the internet.

Sender 102, Receiver 106, and Attacker 104 may be connected to additional network elements. Other embodiments may include fewer or more network elements than those illustrated. Specifically, in a practical system there may be any number of network elements.

For purposes of describing FIG. 1, assume that Sender 102 and Receiver 106 implement TCP only as defined in RFC 793, and are using a window size of 4000. Sender 102 sends Receiver 106 a segment 110 with a sequence number ("SeqNo") of 101, an ACK value of 5005 and 441 bytes of data. Receiver 106 sends an acknowledgment message 112 with SeqNo 5005 and ACK 543. In this description, a reference such as "SeqNo 543" or "ACK 5005" is used as an abbreviated indication that a TCP segment carries a Sequence Number value of 543 and an Acknowledge value of 5005, respectively.

Next Attacker 104 sends segment 114 with SeqNo 3000, ACK 0x2000000 (33,554,432), and 256 bytes of malicious data. Attacker 104 has guessed SeqNo 3000 without actual knowledge of the sequence numbers that are then currently in use by Sender 102 and Receiver 106 for the TCP connection, and SeqNo 3000 is an allowed SeqNo value because (3000<543+4000). No window size comparison is conventionally made for the ACK value, so ACK values in the range of 2,147,488,649 to 4,294,967,295 and 0 to 5001 are acceptable. Attacker 104 has also determined or guessed the network addresses of Sender 102 and Receiver 106, such as their IP addresses, and the port numbers used for the current connection. The address and port values are placed in the spurious segment 114, but are omitted for clarity. Since Attacker 104 is uncertain whether an ACK value of 0x2000000 (33,554,432) is appropriate, Attacker 104 also sends segment 116 with the same SeqNo 3000 but an ACK value of 0x82000000 (2,181,038,080)).

At step 118, Receiver 106 accepts segment 116 but drops segment 114 because its ACK value is not acceptable. Receiver then acknowledges segment 116 by sending segment 120 with SeqNo 5005 and ACK 543. A SeqNo of 5005 is used because segment 112 is the last in-order segment that was received, and Receiver 106 needs to signal that it is awaiting the immediately following segment despite having received segment 116 that appears to be far in the future of the stream. Without a defensive approach, as indicated in step 122, segment 116 is eventually forwarded to and could harm an application that uses, relies on or executes the data in segment 116.

Referring now to FIG. 2, in the first preventive approach herein, in step 202 a TCP segment is received. In step 204, a test is performed to determine if the ACK value carried in the received segment is less than the difference of the next sent but unacknowledged sequence value (snduna, in the parlance of RFC 793) less the lesser of either the total number of segments sent thus far or the maximum window size associated with the TCP connection. In one embodiment, the expression min (snduna—isn, max window size) yields the value that is compared to the unacknowledged sequence value.

The maximum window size value reflects the maximum window size that the peer can manage. The allowed window size may be changed to another window size for particular exchanges of segments, but even if such an adjustment has occurred, the maximum window size is used in the test of step 204. Thus step 204 tests the ACK value of the received segment against a window of past valid ACK values. For step 204 to yield a true result, a valid ACK value cannot be more than one window behind the next expected sequence value.

In contrast, prior approaches admit segments having any ACK value that is within that half of the sequence value space that includes and is earlier than the next unacknowledged sequence value, and provided that the sequence value itself is within the inbound window. In such circumstances RFC 739 permits a receiver to ignore the ACK. RFC 793 only requires that if a received ACK value is greater than that expected by the receiver, then the receiver must send back an ACK segment specifying the expected ACK value. The lack of rigorous requirements in RFC 793 for dealing with ACK values that are earlier than expected presents an attacker with a way to present spurious segments that will be accepted.

If the test of step 204 is true, then in step 206 the segment is dropped and not forwarded to an application or placed in a re-assembly buffer for potential re-ordering and later forwarding. If the test of step 204 is false, then in step 208 other TCP segment processing is performed on the received segment.

In one alternative, the test of step 204 does not allow for the ACK value to fall within a window but instead tests whether the ACK value of the received TCP segment is exactly equal to an expected ACK value or a range of values less than the initial window. If an exact match is not found, then the incoming segment is dropped. This alternative may cause a receiver to discard data that arrives before other valid but delayed data, because when the earlier data arrives the receiver requires an ACK value that the sender has not encountered yet. As a consequence, this approach may force the sender to perform a retransmission. However, this drawback may be acceptable to achieve the benefit of improved attack resistance in network environments that are known to have higher vulnerability to attack.

Using the foregoing approaches, spurious segments are kept out of the re-assembly buffer and not forwarded to higher-layer applications or processes where the spurious segments could cause problems. In particular, with the present approach, a segment is accepted only if its sequence number is within the acceptable window and its ACK value is correct.

Figure 3:
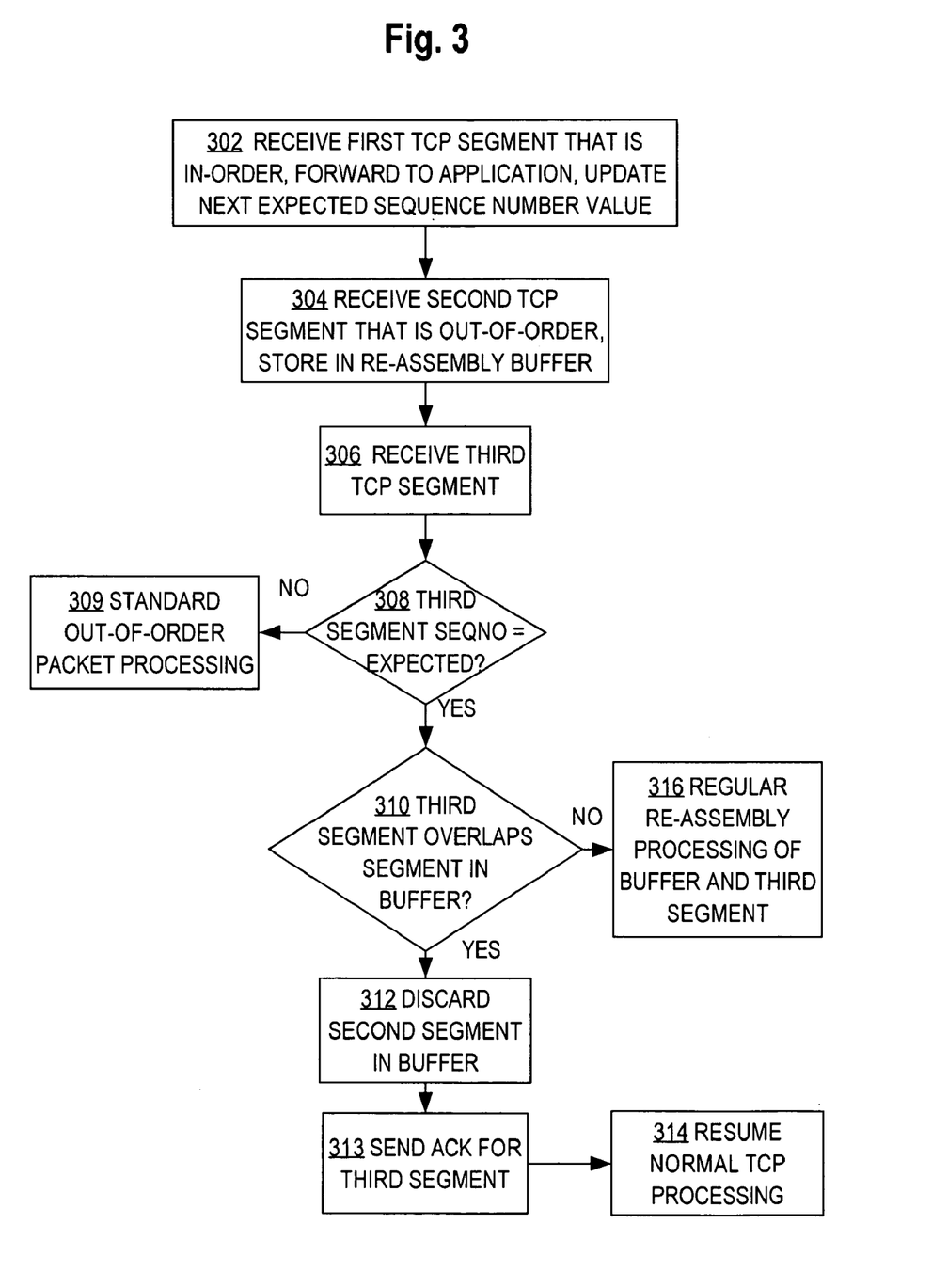
FIG. 3 is a flow diagram that illustrates an approach for removing spurious data segments from a re-assembly buffer based on overlap.
Figure 4:
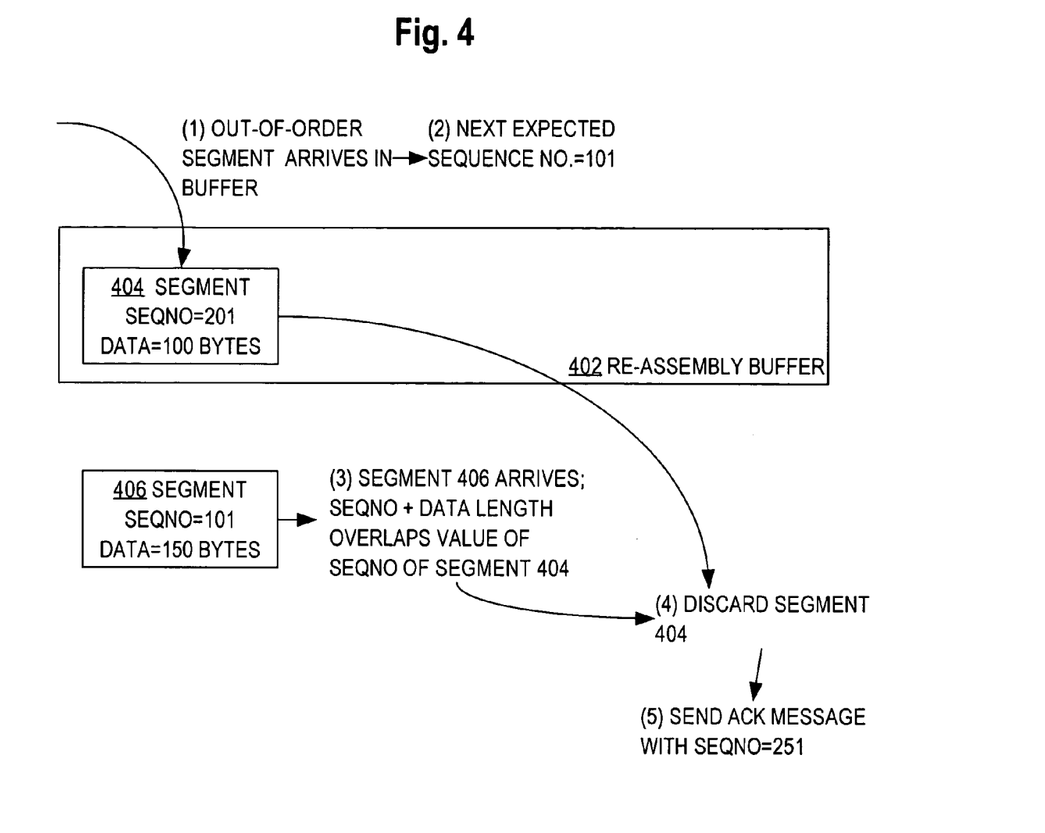
FIG. 4 is a block diagram that shows an example of operation of FIG. 3.

2.2 Approach for Removing Spurious Data Segments from Re-Assembly Buffer Based on Overlap FIG. 3 is a flow diagram that illustrates an approach for removing spurious data segments from a re-assembly buffer based on overlap; FIG. 4 is a block diagram that shows an example of operation of FIG. 3. In general, FIG. 3 provides an approach for removing improperly injected segments from a TCP re-assembly buffer by detecting that the segments are spurious because they improperly overlap data associated with previously received properly acknowledged segments.

Referring first to FIG. 3, steps 302–304 represent preparatory steps that are described to provide context for the solution represented by subsequent steps. In step 302 a first TCP segment is received that is in order. The segment is forwarded to an application, and the next expected sequence number value is updated in memory. The term "first" is used in step 302 to denote that the segment of step 302 occurs before the segments of step 304 and step 306, but the segment of step 302 may arrive at any time after establishment of a TCP connection and need not be the first segment actually received after completing a TCP handshake phase. In step 304, a second segment is received that is out of order, and therefore the second segment is stored in the re-assembly buffer.

In step 306, a third segment is received. In step 308, a test is performed to determine if the SeqNo value carried by the third segment is equal to the next expected SeqNo value. Step 308 also may involve verifying that the sum of the SeqNo of the third segment and the length of its data exactly aligns with other segments in the re-assembly buffer. If not, then in step 309 conventional processing is applied for an out-of-order segment. If the SeqNo value is exactly the next expected value, then the third segment is treated as a trusted segment that has arrived from a legitimate sender in the current connection. The third segment is treated as trusted because the chance that an attacker guessed and sent the exact next expected SeqNo value is 1 in 232.

Accordingly, in step 310 a test is performed to determine if the third segment overlaps any segment that is already in the re-assembly buffer. In this context, "overlap" means that the sum of the SeqNo and the length of the data carried in the third segment overlaps the SeqNo in any segment(s) in the re-assembly buffer. In some cases the third incoming segment may overlap a number of segments that may have come from an attacker. If no such overlap holds, then in step 316 regular re-assembly processing of the buffer and third segment is performed.

However, if overlap is found, then the overlapped segments previously received into in the re-assembly are deemed spurious segments, and the third segment is deemed genuine. Overlap indicates a spurious segment has been received into the re-assembly buffer because a set of genuine segments ultimately will align exactly in sequence when successive SeqNo values are compared to the data length size of a preceding segment in the flow. Moreover, an attacker is required to guess SeqNo values, and therefore the presence of overlap strongly suggests that a SeqNo has been guessed and the associated segment is spurious. Overlap as found in step 310 may be complete overlap or partial overlap. The spurious segment is discarded from the re-assembly buffer at step 312.

In step 313 an ACK message is sent and carries the SeqNo of the third segment. In step 314, normal TCP processing resumes. Such processing may include re-transmission that helps ensure that the re-assembly buffer contains only valid data by requiring the sender to re-transmit data within the range covered by the discarded spurious segment.

An example is now illustrated in connection with FIG. 4. An out-of-order segment 404 with SeqNo 201 and 100 bytes of data previously has been received into re-assembly buffer 402, as shown by numeral 1. As indicated by numeral 2, the next expected sequence number is 101, which is why segment 404 is considered out of order.

At numeral 3, segment 406 arrives with SeqNo 101 and 150 bytes of data. The SeqNo value 101 is exactly the expected next SeqNo value, and therefore the test of step 308 (FIG. 3) is true for segment 406. Further, the sum of 101 and 150 is 251, which overlaps the value of 201 carried by segment 404. Since segment 406 is considered trusted because it carries the exact next expected sequence number, segment 404 is deemed spurious and discarded as shown at numeral 4. An ACK segment is then sent with SeqNo 251 to acknowledge segment 406.

Thus the foregoing approach removes spurious injected data segments that have been inadvertently received into a re-assembly buffer. The approach may be practiced alone or in combination with the approach of section 2.1 herein.

3.0 Implementation Mechanisms—Hardware Overview

Figure 5:
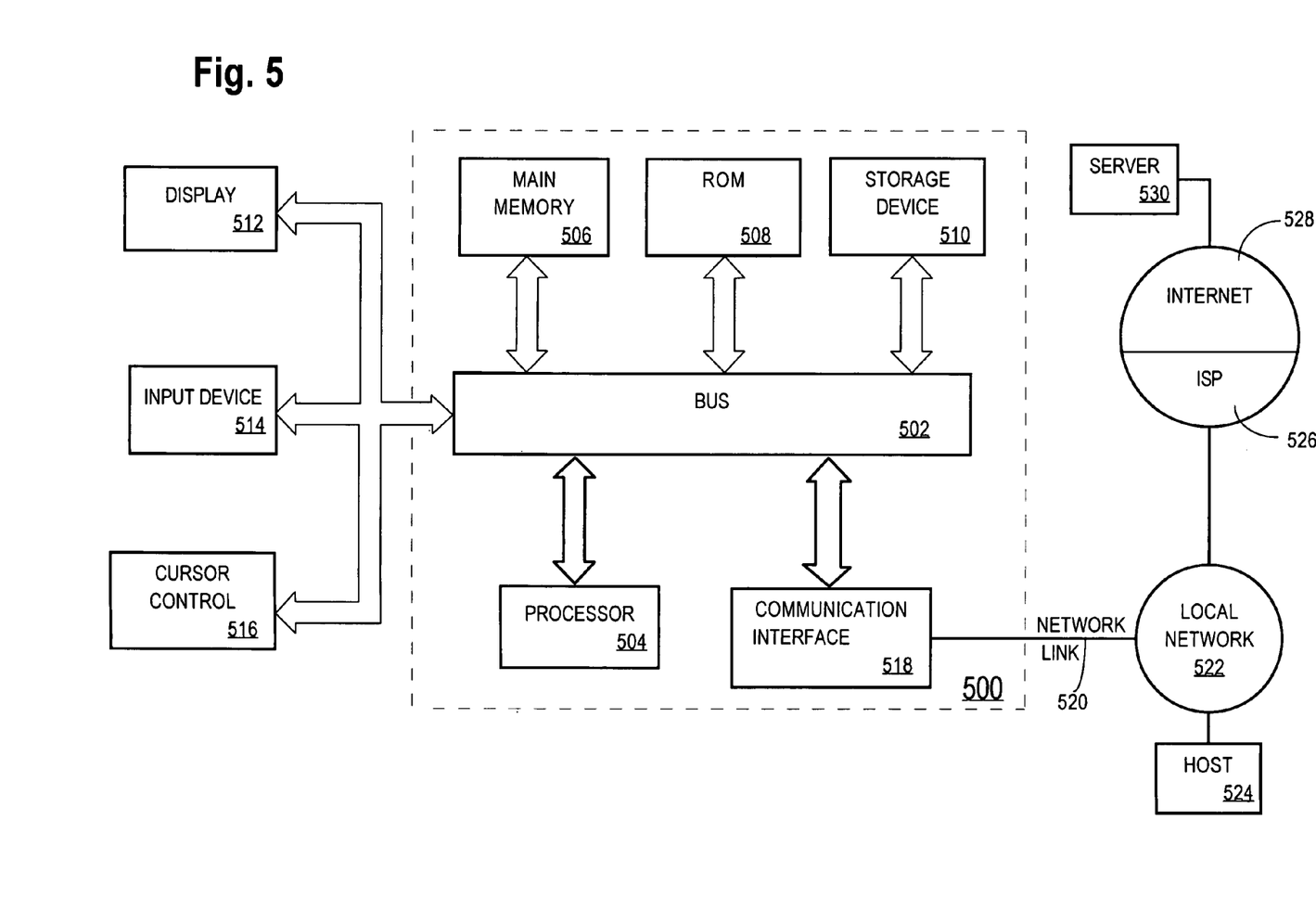
FIG. 5 is a block diagram that illustrates a computer system upon which an embodiment may be implemented.

FIG. 5 is a block diagram that illustrates a computer system 700 upon which an embodiment may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 718. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for implementing the approaches herein. According to one embodiment of the invention, an implementation of the approaches herein is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for detecting network data injection attacks as described herein.

Processor 704 may execute the received code as it is received, and/or stored in storage device 710, or other non-volatile storage for later execution. In this manner, computer system 700 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of preventing an attack on a network, wherein the attack comprises injecting a spurious transmission control protocol (TCP) segment into a TCP connection between a sender and a receiver, the method comprising the computer-implemented steps of:

receiving a TCP segment carrying a sequence value and an ACK value;

determining whether the ACK value is less than the difference of a next unacknowledged sequence value and a lesser of either (a) a total number of bytes sent in the TCP connection or (b) a maximum window size associated with the TCP connection; and discarding the TCP segment when the ACK value is less than the difference of a next unacknowledged sequence value and the lesser of either (a) the total number of bytes sent in the TCP connection or (b) the maximum window size associated with the TCP connection.

2. A method as recited in claim 1, wherein the steps are performed by an endpoint node acting as the receiver of data in the TCP connection.

3. A method as recited in claim 1, wherein the steps are performed by a TCP application of an operating system of a network infrastructure element.

4. A method as recited in claim 1, wherein the steps are performed by a TCP process, stack, adapter or agent hosted by or associated with an operating system of a personal computer, workstation or other network end station.

5. A method as recited in claim 1, wherein the maximum window size comprises a maximum TCP sequence value window size that an endpoint node in the TCP connection can manage without regard to any change in current window size that either endpoint may establish during the TCP connection.

6. A method as recited in claim 1,
wherein the determining step comprises determining whether the ACK value is equal to an expected ACK value or a range of values less than an initial sequence value window; and
wherein the discarding step comprises discarding the TCP segment when the ACK value is equal to an expected ACK value or a range of values less than an initial sequence value window.

7. A method of preventing an attack on a network, wherein the attack comprises injecting a spurious transmission control protocol (TCP) segment into a TCP connection between a sender and a receiver the method comprising the computer-implemented steps of:
receiving a first TCP segment carrying a sequence value;
determining whether the sequence value is equal to a next expected sequence value;
when the sequence value is equal to a next expected sequence value, determining whether data carried in the first TCP segment overlaps data carried in one or more second TCP segments that were previously received in a re-assembly buffer; and
discarding all TCP segments that are in the re-assembly buffer when the first TCP segment overlaps any data segment previously received in the re-assembly buffer.

8. A method as recited in claim 7, further comprising storing the first TCP segment in the re-assembly buffer when the first TCP segment overlaps any data segment previously received in the re-assembly buffer.

9. A method as recited in claim 7, wherein the data carried in the first TCP segment overlaps data carried in the one or more second TCP segments that were previously received in the re-assembly buffer when a first sum of a first sequence value and data length carried in the first TCP segment is less than a second sequence value carried in any of the second segments.

10. A method as recited in claim 7, wherein the discarding step is performed when the first TCP segment completely overlaps any data segment previously received in the re-assembly buffer.

11. A method as recited in claim 7, further comprising the step of sending an acknowledgment message that acknowledges data the sequence values of the first TCP segment.

12. A method as recited in claim 7, wherein the steps are performed by an endpoint node acting as the receiver of data in the TCP connection.

13. A method as recited in claim 7, wherein the steps are performed by a TCP application of an operating system of a network infrastructure element.

14. A method as recited in claim 7, wherein the steps are performed by a TCP process, stack, adapter or agent hosted by or associated with an operating system of a personal computer, workstation or other network end station.

15. A computer-readable tangible storage medium carrying one or more sequences of instructions for preventing an attack on a network, wherein the attack comprises sending a spurious transmission control protocol (TCP) segment with unwanted or spurious DATA, wherein the execution of the one or more sequences of instructions by one or more processors causes the one or more processors to perform:
receiving a TCP segment carrying a sequence value and an ACK value;
determining whether the ACK value is less than the difference of a next unacknowledged sequence value and a lesser of either (a) a total number of bytes sent in the TCP connection or (b) a maximum window size associated with the TCP connection; and
discarding the TCP segment when the ACK value is less than the difference of a next unacknowledged sequence value and the lesser of either (a) the total number of bytes sent in the TCP connection or (b) the maximum window size associated with the TCP connection.

16. A computer-readable tangible storage medium carrying one or more sequences of instructions for preventing an attack on a network, wherein the attack comprises injecting a spurious transmission control protocol (TCP) segment into a TCP connection between a sender and a receiver, wherein the execution of the one or more sequences of instructions by one or more processors causes the one or more processors to perform:
receiving a first TCP segment carrying a sequence value;
determining whether the sequence value is equal to a next expected sequence value;
when the sequence value is equal to a next expected sequence value, determining whether data carried in the first TCP segment overlaps data carried in one or more second TCP segments that were previously received in a re-assembly buffer; and
discarding all TCP segments that are in the re-assembly buffer when the first TCP segment overlaps any data segment previously received in the re-assembly buffer.

17. An apparatus for preventing an attack on a network, wherein the attack comprises sending a spurious transmission control protocol (TCP) segment with a spurious or unwanted DATA, comprising:
means for receiving a TCP segment carrying a sequence value and an ACK value;
means for determining whether the ACK value is less than the difference of a next unacknowledged sequence value and a lesser of either (a) a total number of bytes sent in the TCP connection or (b) a maximum window size associated with the TCP connection; and
means for discarding the TCP segment when the ACK value is less than the difference of a next unacknowledged sequence value and the lesser of either (a) the total number of bytes sent in the TCP connection or (b) the maximum window size associated with the TCP connection.

18. An apparatus as recited in claim 17, comprising an endpoint node acting as the receiver of data in the TCP connection.

19. An apparatus as recited in claim 17, wherein the means comprise a TCP application of an operating system of a network infrastructure element.

20. An apparatus as recited in claim 17, wherein the means comprise a TCP process, stack, adapter or agent hosted by or associated with an operating system of a personal computer, workstation or other network end station.

21. An apparatus as recited in claim 17, wherein the maximum window size comprises a maximum TCP sequence value window size that an endpoint node in the TCP connection can manage without regard to any change in current window size that either endpoint may establish during the TCP connection.

22. An apparatus as recited in claim 17,
wherein the determining means comprises means for, determining whether the ACK value is equal to an expected ACK value or a range of values less than an initial sequence value window; and
wherein the discarding means comprises means for discarding the TCP segment when the ACK value is equal to an expected ACK value or a range of values less than an initial sequence value window.

23. An apparatus for preventing an attack on a network, wherein the attack comprises sending a spurious transmission control protocol (TCP) segment with spurious or unwanted DATA, comprising:
a processor;
one or more stored sequences of instructions that are accessible to the processor and which, when executed by the processor, cause the processor to perform:
receiving a TCP segment carrying a sequence value and an ACK value;
determining whether the ACK value is less than the difference of a next unacknowledged sequence value and a lesser of either (a) a total number of bytes sent in the TCP connection or (b) a maximum window size associated with the TCP connection; and
discarding the TCP segment when the ACK value is less than the difference of a next unacknowledged sequence value and the lesser of either (a) the total number of bytes sent in the TCP connection or (b) the maximum window size associated with the TCP connection.

24. An apparatus as recited in claim 23, comprising an endpoint node acting as the receiver of data in the TCP connection.

25. An apparatus as recited in claim 23, wherein the steps are performed by a TCP application of an operating system of a network infrastructure element.

26. An apparatus as recited in claim 23, wherein the steps are performed by a TCP process, stack, adapter or agent hosted by or associated with an operating system of a personal computer, workstation or other network end station.

27. An apparatus as recited in claim 23, wherein the maximum window size comprises a maximum TCP sequence value window size that an endpoint node in the TCP connection can manage without regard to any change in current window size that either endpoint may establish during the TCP connection.

28. An apparatus as recited in claim 17,
wherein the determining step comprises determining whether the ACK value is equal to an expected ACK value or a range of values less than an initial sequence value window; and
wherein the discarding step comprises discarding the TCP segment when the ACK value is equal to an expected ACK value or a range of values less than an initial sequence value window.

29. An apparatus for preventing an attack on a network, wherein the attack comprises injecting a spurious transmission control protocol (TCP) segment into a TCP connection between a sender and a receiver, the apparatus comprising:
means for receiving a first TCP segment carrying a sequence value;
means for determining whether the sequence value is equal to a next expected sequence value;
means for determining, when the sequence value is equal to a next expected sequence value, whether data carried in the first TCP segment overlaps data carried in one or more second TCP segments that were previously received in a re-assembly buffer; and
means for discarding all TCP segments that are in the re-assembly buffer when the first TCP segment overlaps any data segment previously received in the re-assembly buffer.

30. An apparatus as recited in claim 29, further comprising means for storing the first TCP segment in the re-assembly buffer when the first TCP segment overlaps any data segment previously received in the re-assembly buffer.

31. An apparatus as recited in claim 29, wherein the data carried in the first TCP segment overlaps data carried in the one or more second TCP segments that were previously received in the re-assembly buffer when a first sum of a first sequence value and data length carried in the first TCP segment is less than a second sequence value carried in any of the second segments.

32. An apparatus as recited in claim 29, wherein the discarding means comprises means for discarding when the first TCP segment completely overlaps any data segment previously received in the re-assembly buffer.

33. An apparatus as recited in claim 29, further comprising means for sending an acknowledgment message that acknowledges data the sequence values of the first TCP segment.

34. An apparatus as recited in claim 29, comprising an endpoint node acting as the receiver of data in the TCP connection.

35. An apparatus as recited in claim 29, wherein the means comprise a TCP application of an operating system of a network infrastructure element.

36. An apparatus as recited in claim 29, wherein the means comprise a TCP process, stack, adapter or agent hosted by or associated with an operating system of a personal computer, workstation or other network end station.

37. An apparatus for preventing an attack on a network, wherein the attack comprises sending a spurious transmission control protocol (TCP) segment with spurious or unwanted DATA, comprising:
a processor;
one or more stored sequences of instructions that are accessible to the processor and which, when executed by the processor, cause the processor to carry out the steps of:
receiving a first TCP segment carrying a sequence value;
determining whether the sequence value is equal to a next expected sequence value;
determining, when the sequence value is equal to a next expected sequence value, whether data carried in the first TCP segment overlaps data carried in one or more second TCP segments that were previously received in a re-assembly buffer; and
discarding all TCP segments that are in the re-assembly buffer when the first TCP segment overlaps any data segment previously received in the re-assembly buffer.

38. An apparatus as recited in claim 37, further comprising instructions for storing the first TCP segment in the re-assembly buffer when the first TCP segment overlaps any data segment previously received in the re-assembly buffer.

39. An apparatus as recited in claim 37, wherein the data carried in the first TCP segment overlaps data carried in the one or more second TCP segments that were previously received in the re-assembly buffer when a first sum of a first sequence value and data length carried in the first TCP segment is less than a second sequence value carried in any of the second segments.

40. An apparatus as recited in claim 37, wherein the instructions for discarding comprise instructions for discarding when the first TCP segment completely overlaps any data segment previously received in the re-assembly buffer.

41. An apparatus as recited in claim 37, further comprising instructions for sending an acknowledgment message that acknowledges data the sequence values of the first TCP segment.

42. An apparatus as recited in claim 37, comprising an endpoint node acting as the receiver of data in the TCP connection.

43. An apparatus as recited in claim 37, wherein the instructions comprise a TCP application of an operating system of a network infrastructure element.

44. An apparatus as recited in claim 37, wherein the instructions comprise a TCP process, stack, adapter or agent hosted by or associated with an operating system of a personal computer, workstation or other network end station.

\* \* \* \* \*